Figure 1:
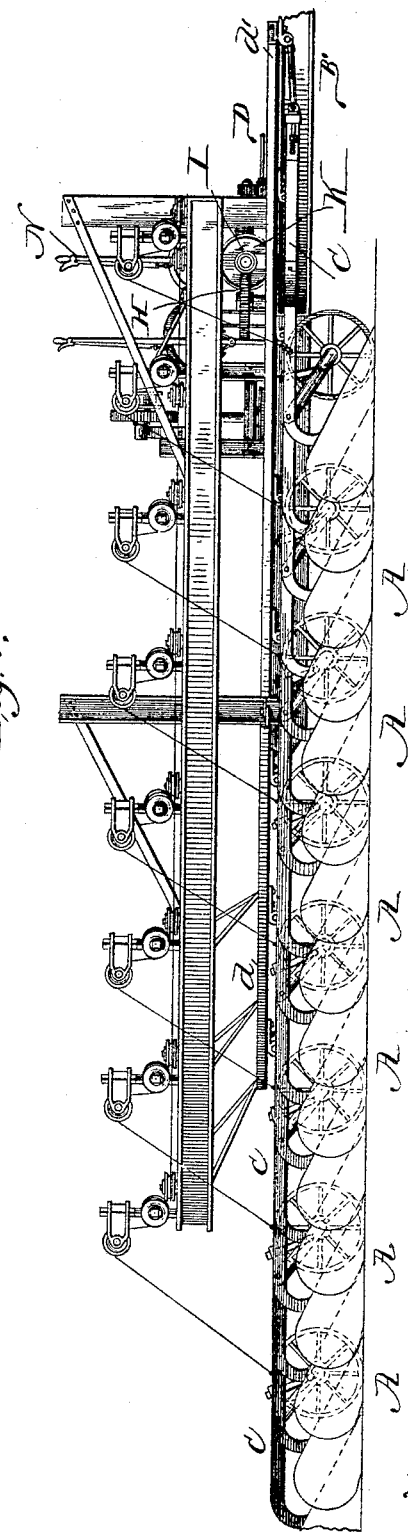

(No Model.) 2 Sheets—Sheet 1.

J. A. GARDNER.
PLOWING DEVICE FOR TRACTORS.

No. 437,755. Patented Oct. 7, 1890.

Witnesses—
N. Rossiter
A. Bates

Inventor:
John A. Gardner
By Chas. G. Page
Atty (No Model.) 2 Sheets—Sheet 2.
J. A. GARDNER.
PLOWING DEVICE FOR TRACTORS.
No. 437,755. Patented Oct. 7, 1890.
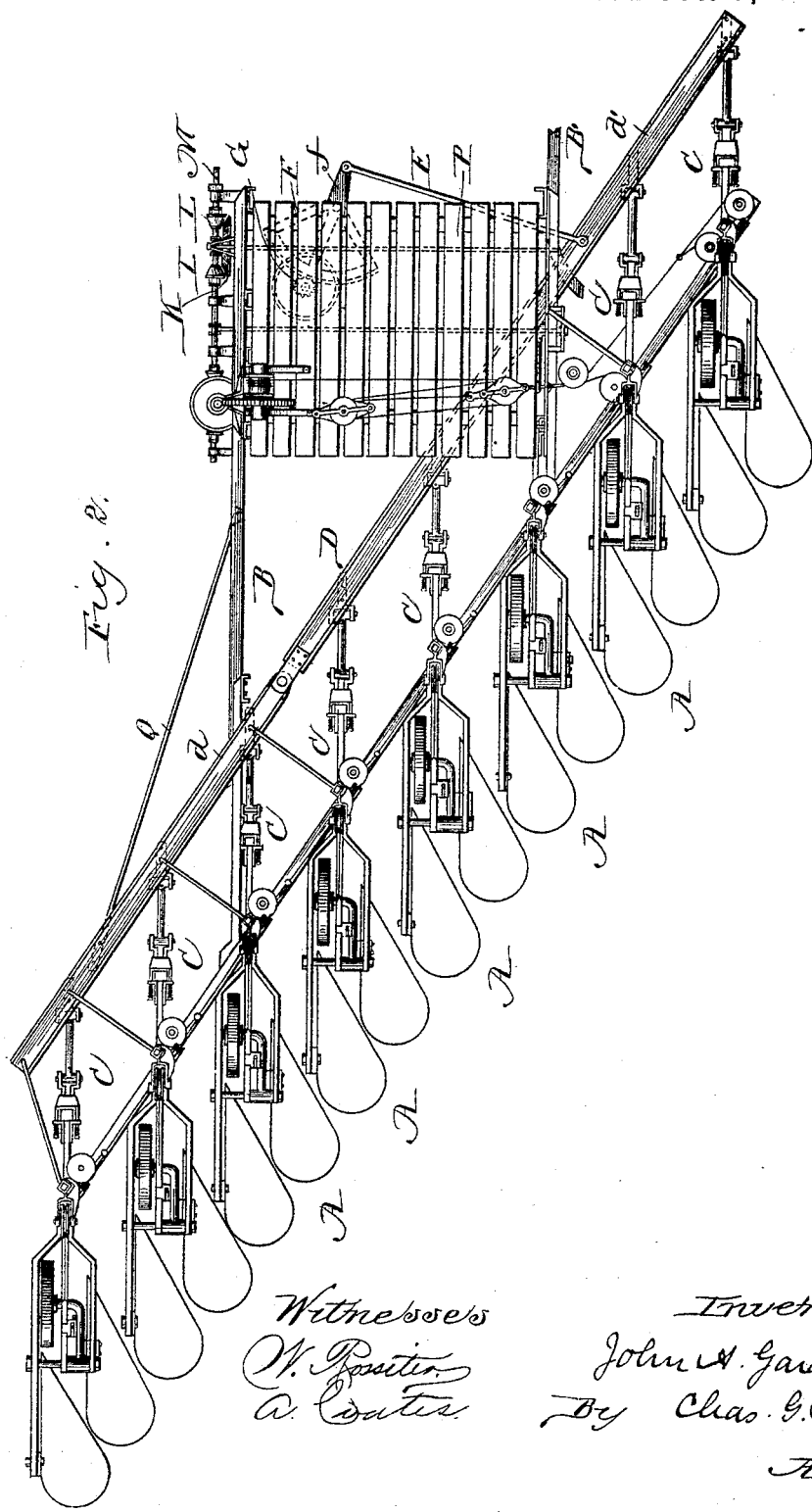

UNITED STATES PATENT OFFICE.

JOHN A. GARDNER, OF CHICAGO, ILLINOIS.

PLOWING DEVICE FOR TRACTORS.

SPECIFICATION forming part of Letters Patent No. 437,755, dated October 7, 1890.

Application filed July 11, 1889. Serial No. 317,249. (No model.)

*To all whom it may concern:*

Be it known that I, JOHN A. GARDNER, a citizen of the United States, residing at Chicago, in the county of Cook and State of Illinois, have invented a certain new and useful Improvement in Plowing Devices for Tractors, of which the following is a specification.

My invention relates to a construction of machine described in application No. 316,667 of Severin C. A. Holth, filed on or about July 6, 1889, and has for its object to permit a general adjustment of the plows, so that should the first furrow be started wrong the fault can be readily corrected.

In a machine characterized by my invention a set of plows are connected with a draft-bar which is arranged obliquely to the length of the machine, so as to provide a diagonally-arranged gang or series of plows. The draft-bar, or the greater portion of the draft-bar, is arranged to swing horizontally, and hence is pivotally held at one end. Means are provided for swinging the draft-bar, so that it can be adjusted by giving it such extent of swing as may be found necessary in plowing.

In the drawings, Figure 1 represents in side elevation the position of a machine embodying my invention. Fig. 2 is a top plan view of Fig. 1.

The plows A are arranged in a gang or series which is oblique to the length of the machine, it being understood that B and B' denote rear portions of the main frame of the machine, and that for the purposes of this application a representation of an entire machine comprising a traction-propelling device and various adjuncts is unnecessary. The plow-beams C are hinged to a draft-bar D, which is arranged obliquely to the length of the machine. Said draft-bar comprises a short section $d$, which is rigidly secured to the main frame of the machine, and a long section $d'$, which is pivotally connected with the short fixed section, so that it can be swung horizontally. A majority of the plow-beams are attached to the swinging draft-bar section $d'$, so that should the first furrow be started wrong the swinging draft-bar section can be swung or adjusted in a way to correct the fault. When the swinging draft-bar section is thus adjusted, the plows connected therewith will properly line themselves, it being understood that the plow-beams will be so attached to the draft-bar as to swing horizontally as well as vertically, and that the fault or error will upon the occasion of such adjustment of the swinging draft-bar section be distributed, and, so to speak, averaged up throughout the set of plows.

The swinging adjustment of the draft-bar section $d'$ can be effected by various means, a preferred way being to connect it with an adjusting mechanism which can be operated from the driving-engine of the machine, as set forth in said application. Said adjusting mechanism comprises a connecting-rod E, which is at one end attached to the swinging draft-bar section and at its opposite end attached to the arm $f$ of a vibratory segment-gear F, as shown in dotted lines in Fig. 2. The segment-gear F engages a cog G on a spindle, which is also provided with a worm-wheel H. The worm-wheel H engages and is operated by a worm-shaft I, which is at one end provided with a beveled friction-wheel K. The beveled friction-wheel K can be engaged by either of a couple of small conical friction-wheels L, which are arranged upon a rotary shaft M. The rotary shaft M is also susceptible of end movement, so that either one of its small conical friction-wheels can be thrown into gear with the beveled friction-wheel K, and said shaft is understood to be suitably gear-connected with a power-shaft which extends forwardly to the engine.

A lever N is provided for shifting the shaft M endwise, and said lever is arranged within convenient reach of an attendant, who may stand upon the platform P.

The draft-bar section $d$ can be braced in any suitable way, as, for example, by a brace Q.

What I claim as my invention is—

1. The combination, in a plowing device for tractors, of the horizontally-swinging bar $b'$, arranged obliquely to the length of the machine and pivotally held at its rear end, and an obliquely-arranged gang of plows having the forward ends of their beams pivotally connected with the bar $b'$, substantially as and for the purpose described.

2. The combination, in a plowing device for tractors, of the obliquely-arranged draft-bar comprising a bar $b$, which is rigid with the main frame, and a horizontally-swinging bar $b'$, which is pivoted at its rear end to the bar $b$, and an obliquely-arranged gang of plows having the forward ends pivotally connected with said bars, a majority of the plows of said gang being connected with said swinging bar $b'$, substantially as and for the purpose described.

3. The combination, in a plowing device for tractors, of the obliquely-arranged and horizontally-swinging bar $b'$, pivotally held at its rear end, an obliquely-arranged gang of plows having their beams pivotally connected with the horizontally-swinging bar, and means for swinging said bar $b'$, comprising a reversible gear mechanism connected with the bar, substantially as set forth.

4. The combination, in a plowing device for tractors, of the obliquely-arranged and horizontally-swinging bar $b'$, pivotally held at one end, an obliquely-arranged gang of plows having their beams pivotally connected with the swinging bar, the vibratory segment-gear F, link connected with the swinging bar, a cog G, engaging the segment-gear, a worm-wheel H, fixed on the spindle of the worm-wheel, a worm-shaft I, engaging the worm-gear, and provided with a beveled friction-wheel K, the friction-wheel L, carried by a longitudinally-adjustable rotary shaft and arranged for alternate engagement with the beveled friction-wheel, and a hand-lever for shifting said shaft endwise, substantially as set forth.

JOHN A. GARDNER.

Witnesses:
CHAS. G. PAGE,
A. COATES.